July 5, 1932.  G. A. BIGGS  1,865,502

HYDRAULIC TURBINE

Filed May 24, 1929  3 Sheets-Sheet 1

INVENTOR.

GEORGE A. BIGGS

BY

*Taulmin & Taulmin*

ATTORNEY.

July 5, 1932.   G. A. BIGGS   1,865,502
HYDRAULIC TURBINE
Filed May 24, 1929   3 Sheets-Sheet 2
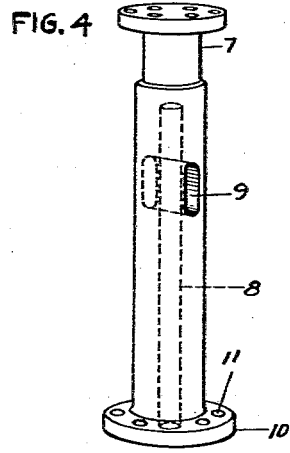
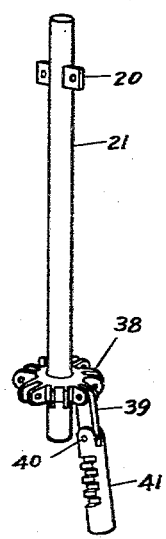
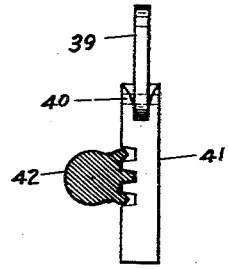
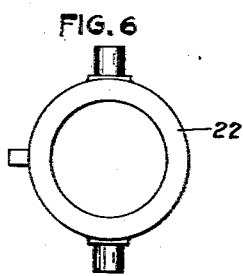
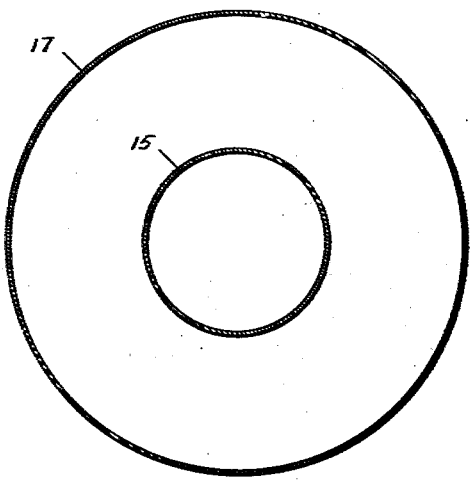
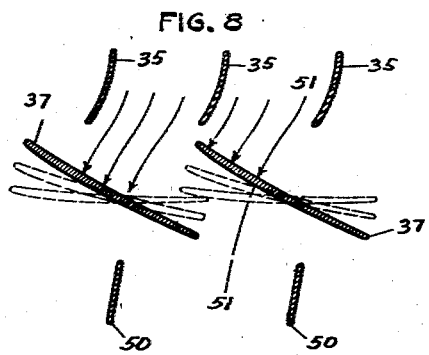
INVENTOR.
GEORGE A. BIGGS
BY
*Toulmin & Toulmin*
ATTORNEY.

July 5, 1932.　　　G. A. BIGGS　　　1,865,502
HYDRAULIC TURBINE
Filed May 24, 1929　　　3 Sheets-Sheet 3

Inventor
GEORGE A. BIGGS
By Toulmin & Toulmin
Attorneys

Patented July 5, 1932

1,865,502

UNITED STATES PATENT OFFICE

GEORGE A. BIGGS, OF SPRINGFIELD, OHIO, ASSIGNOR TO THE JAMES LEFFEL & COMPANY, OF SPRINGFIELD, OHIO, A CORPORATION OF OHIO

HYDRAULIC TURBINE

Application filed May 24, 1929. Serial No. 365,650.

This invention relates to hydraulic turbines.

It is an object of my invention to provide a hydraulic turbine or rotary pump for use in connection with any kind of fluid.

It is an object to provide a low cost, high efficiency mechanism eliminating movable gates, controlling speed and power output by adjustment of the runner vanes and introducing driving fluid vertically rather than from the sides or radially of the turbine axis.

It is a further object to reduce the clearance space between the guide vanes and the runner vanes.

It is an additional object to control the speed of the turbine with a governor without the use of movable gates.

It is an object to provide a turbine which can be installed through such a limited hole in the power house floor that a special expensive base for the generator will not be necessary.

It is a further object to provide a turbine which will not be affected in a detrimental way by irregular currents of fluid in the central part of the draft tube.

It is a further object to provide a turbine having a one-piece runner hub.

It is a further object to provide a turbine in which the axes of the movable runner vanes are disposed at an angle to the axis of the turbine in such a manner that the intersection of the axes of the vanes and the outer ends of the vanes are at a higher elevation than the intersection of the vane axes and the turbine axis.

It is my object to provide a turbine in which the inner or working surface of the outer guide case wall is tangent to the wall of the draft tube.

It is a further object to provide a turbine in which the fluid can be cut off by closing the runner vanes, thereby eliminating gates.

It is an object to provide a turbine in which the fluid is projected against the runner vanes in a constant direction regardless of power or speed which the turbine produces. The impeller described herein is described and claimed in my copending application Ser. No. 423,314.

Referring to the drawings:

Fig. 4 is a perspective of the runner shaft;

Fig. 5 is a perspective of the internal shaft;

Fig. 6 is a plan view of the yoke collar;

Fig. 7 is a section on the line 7—7 of Fig. 1, showing the rack and cogs on the stem of a runner vane;

Fig. 8 is a section on the line 8—8 of Fig. 1 through the guide, runner and draft tube vanes;

Fig. 9 is a section through the draft tube and internal core tube showing the relationship of the parts. This section is taken on line 9—9 of Fig. 1.

Figure 1:
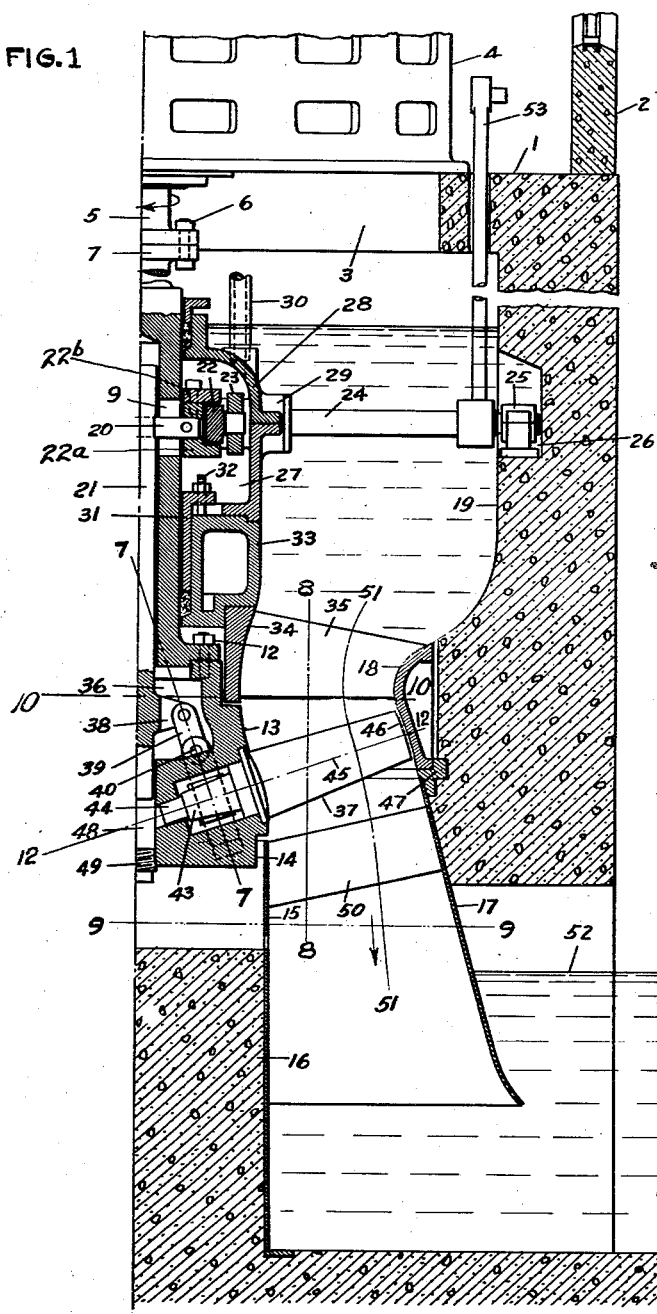
Fig. 1 is a section through one half of the supporting foundation, draft tube and turbine runner.
Figure 2:
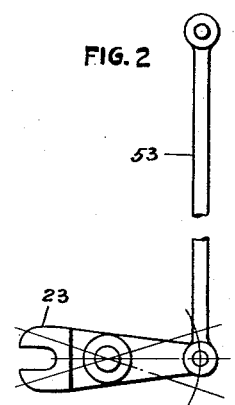
Fig. 2 is an elevation of the control levers, yoke and control rods.
Figure 3:
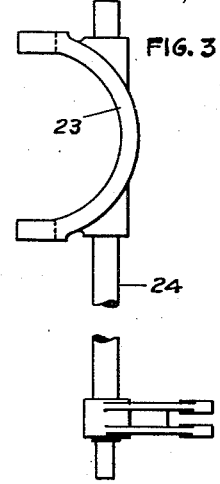
Fig. 3 is a plan view of parts of Fig. 2.
Figure 10:
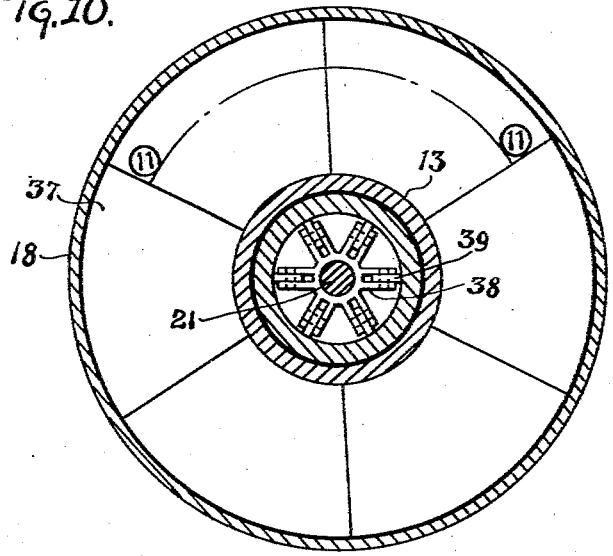
Figure 11:
Figure 12:
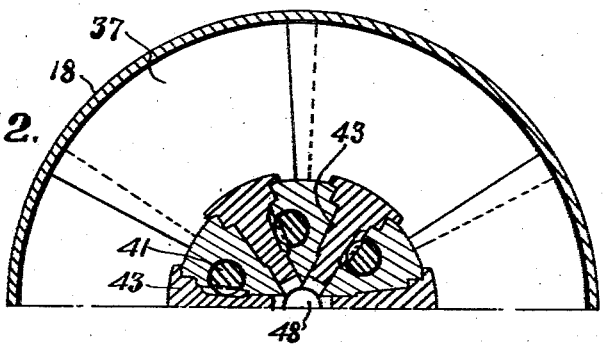

Figure 10 is a section on the line 10—10 of Figure 1. Figure 11 is a section on the line 11—11 of Figure 10. Figure 12 is a section on the line 12—12 of Figure 1.

Referring to the drawings in detail, 1 is the floor of the power house 2. Over an opening 3 in the floor 1 is mounted a generator 4. Connected to the generator shaft 5 by the bolts 6 is the runner shaft 7. This shaft as will be seen in Fig. 4 is closed at its upper end where it is provided with a flange for attaching it to the generator shaft. It is provided with an internal tubular passageway 8 and a transverse passageway 9. The lower end of the runner shaft is provided with a flange 10 having apertures 11 for receiving the bolts 12 for attaching thereto the runner hub of one piece, designated 13. The lower end of this hub is offset inwardly, as at 14, within the central core tube 15 that is mounted upon the concrete core 16 forming the inner wall of a passageway for fluid the outer wall of which is formed on the lower portion by the draft tube 17 and in the upper portion by the guide vane ring 18 and the foundation 19.

Referring to the runner shaft, it will be noted that a transverse pin 20 is carried on the internal shaft 21. The internal shaft 21 fits within the passageway 8 in the runner shaft 7 and transverse pin 20 within the slot 9 of runner shaft 7. The pin 20 is adapted to move up and down within the slot 9. The exterior ends of pin 20 are attached to the collar 22a which with the ring 22b, form a groove for the yoke ring 22 and slides on the outside of the runner shaft and is caused to do so by the yoke 23 whose arms have slots to receive pins on the yoke ring. This yoke 23 is carried on the shaft 24 which is journaled at 25 in a recess 26 of the foundation 19. The yoke itself is located within the chamber 27 formed by the yoke casing 28. The shaft 24 is journaled at its yoke end at 29 in the casing. A pipe 30 communicates to this casing and extends upwardly to a point convenient to the power house operator so that lubricant can be introduced into the chamber 27. This lubricant serves to lubricate the bearing sleeves 31 surrounding the runner shaft and supported by bolts 32 upon an annular collar 33 which also supports the housing 28. The lower edge of this collar 33 rests upon its inner guide vane ring 34 which supports it and the outer guide vane ring 18 to stationary guide vanes 35.

The hub 13 is suspended in spaced relationship with respect to the inner guide vane ring 34. The lubricant introduced to the passageway 30 also passes through the passageways 9 and 8 into the chamber 36 within the hub 13 permitting the lubrication of the parts which are connected to the runner blades 37 that are pivotally mounted within the hub 13 and which are adjusted by the movement of inner shaft 21.

This inner shaft 21 is provided with ears 38 to which are pivoted links 39 the free ends of which are pivoted at 40, the racks 41 engaging with the teeth of a mutilated gear 42 formed on the hub 43 of shaft 44 of the buckets 37. The axes of the buckets, designated 45, make an acute angle with the runner axis, such an acute angle being above the axes 45 and between it and the runner axis. The outer ends of the buckets 45 as at 46 are spaced an equidistant amount from the inner face of the outer guide ring that flares outwardly at this point. This ring is supported on a collar 47 to which is attached the draft tube 17.

The hub 13 is provided with a central chamber 48 in which the shaft 21 reciprocates. This chamber is closed by a screw plug 49 which is located within the wall 15. Between the walls 15 and 17 are draft tube vanes 50.

The line of water flow is substantially indicated by the line 51—51. The tail waters are designated 52.

Control of runner vane position

The movement of shaft 53 which projects into the power house either manually or by a governor will control the position of the runner buckets 45.

As will be seen in Fig. 8, such buckets may be positioned to completely close the passageway for fluid. Therefore, I eliminate any necessity of having gates, and I am enabled to reduce the cost and the complexity of the mechanism and eliminate side delivery of the fluid by removing the gates, gate rings and accompanying mechanisms.

Method of operation

By the elimination of the gates, I eliminate the danger of damage which prevails due to rubbish or other foreign material becoming lodged between the gates when closing. I further provide when operating my turbine for a bladeless space between the guides and runner vanes and eliminate the former 90° turn of fluid. I provide a turbine in which the fluid is projected against the runner vanes in a constant direction irrespective of power or speed which the turbine produces. In operation my movable vanes are so disposed that their axes are at right angles to the line of flow of fluid where it crosses the axes. Thus my mechanism is adapted to either high speed or low speed conditions.

With this understanding, assuming that the turbine is standing still and the runner vanes are closed, with the head water level as indicated, I am ready to put my turbine into operation. I raise the control rod 53 which allows the water to flow through the turbine. The water passes between the stationary guides 35 causing the turbine to move. The speed of rotation of the power can be increased or decreased by admitting more or less water according to the position of the runner vanes.

The result of this arrangement is that I have eliminated one of the most expensive parts of the existing turbine, that is, the gate case. The elimination of such a case and associate mechanism with the gates, of which there are from 16 to 20, usually eliminates some 35 separate castings, 16 to 20 pivot bolts, 32 to 40 pins and numerous other parts together with their attendant labor of assembling and fitting. All movable parts associated with the former gates are eliminated. I use the runner vanes to close off the water in place of using the gates for that purpose.

Again, by eliminating the 90° turn of fluid, it is possible to obtain the most favorable hydraulic conditions within the runner at low stages of power which were heretofore impossible. I have eliminated the tendency of the water to rotate in a ring around the outer circumference of the runner chamber and within the runner itself, leaving the water in the central part of the runner in a state of commotion which reduces the efficiency. By my invention this difficulty is obviated by actually directing the flow of water over the entire area of runner vanes, evenly at all stages of power, thereby avoiding a commotion or turbulence of the water in the central part. It will be noted that the line of flow 51—51 of the water varies very little in direction which is favorable to higher efficiency. As the wall adjacent the tips of buckets 46 is tangent to the wall of the draft tube, there is avoided any change in direction. The transition space between the discharge ends of the guides 35 and the entrance edges of the runner vanes 37 is reduced so that there is a minimum change in direction of flow within this space. By making the axes of the runner vanes 37 inclined as at 45, the water is discharged from the draft tube 17 in the direction in which its course through the draft tube is to continue so that no energy is lost through change in the direction of flow.

By provision of lubrication through the pipe 30 all the parts are lubricated from a single source.

It will be noted that the entire structure can be inserted through the hole 3 in the power house floor 1, which can be easily spanned by the usual generator 4 without providing the customary enlarged base for the generator. By using a small diameter guide case and by admitting the water to the turbine from above instead of from around the sides, the walls of the housing can be set closer to the turbine which results in a small and less expensive housing.

It will be noted that I have provided a concrete core 16 and a tube 15 surrounding it. The purposes of this structure is to fill the space that is ordinarily occupied by irregular, disturbing currents which have a tendency to impede the flow of water through the draft tube. By filling the space ordinarily occupied by such currents I am able to gain greater efficiency, as the remaining flow of fluid is not disturbed.

It will be understood that I desire to comprehend within my invention and within the scope of my claims such modifications as may be fairly comprehended within such claims and invention due to necessary modifications to adapt my invention to varying conditions of use and to varying purposes.

Having thus fully described my invention, what I claim is new and desire to secure by Letters Patent is:

1. In combination in a gateless hydraulic turbine, a runner, a plurality of adjustable buckets, a plurality of superimposed superior stationary guide vanes, a plurality of inferior stationary draft tube vanes, outer and inner guide vane rings for supporting the superior vanes, the inner ring being supported by the outer ring, a draft tube for supporting the inferior vanes and a core tube adapted to support the inner end of said inferior vanes.

2. In combination in a gateless hydraulic turbine having an axial fluid flow, a runner with adjustable buckets, a plurality of superior guide vanes, inner and outer guide rings for said vanes, said blades and inner ring being supported by the outer ring, said outer ring being adjacent to the ends of the runner buckets and a plurality of draft tube vanes below said buckets, said axes of the buckets being at an angle to the runner axes of the turbine.

3. In combination in a hydraulic turbine having an axial flow of fluid, a runner, a passage around the runner, a foundation wall spaced therefrom forming a vertical fluid passageway, horizontally disposed stationary vanes at the bottom of said passageway, inner and outer guide rings supporting said vanes forming an arcuate, downwardly and outwardly disposed wall forming a passageway, a runner having a plurality of adjustable buckets located within said arcuate passageway at right angles to the line of flow of fluid therethrough and to the downwardly and outwardly disposed wall, a draft tube below said buckets and guide vanes in said draft tube.

4. In combination, in a hydraulic turbine, a runner shaft, a one-piece runner hub, a casing around said shaft, an inner guide ring between said casing and said runner hub, an outer guide ring, guide vanes stationarily stationed therebetween, a plurality of adjustable buckets carried by said hub at right angles to the fluid flow beneath said guide vanes, a draft tube, a core tube, the upper end of which surrounds said hub at its lower end and guide vanes between said tubes below said buckets.

5. In combination, in a hydraulic turbine runner, a cylindrical core located centrally beneath and adjacent to the bottom of said runner, a core tube mounted thereon extending above the core and surrounding a portion of the runner, a draft tube spaced from said core adjacent said runner and buckets interposed in the space through which fluid flows into the area between said core tube and draft tube.

6. In combination, in hydraulic turbine, a vertically disposed runner shaft and hub, a core disposed directly thereunder, a draft tube and foundation forming a vertical chamber surrounding said runner and its hub and forming a vertical passage for fluid and adjustable buckets interposed at right angles through the flow of fluid therethrough.

7. In combination, in a hydraulic turbine, a vertically disposed runner shaft and hub, a core disposed directly thereunder, a draft tube and foundation forming a vertical chamber surrounding said runner and its hub and forming a vertical passage for fluid and adjustable buckets interposed at right angles through the flow of fluid therethrough and means for adjusting said buckets to close off the passage of fluid therethrough.

8. In combination, a hollow runner shaft, a hollow hub, a plurality of rotatable buckets mounted thereon, an internally disposed reciprocator operating said shaft connected to said buckets, a transverse shaft mounted thereon, a collar connected thereto, a stationary yoke adapted to move said collar vertically on the runner shaft, remote means for actuating said yoke, a stationary casing enclosing said runner shaft and said yoke, an inner guide ring supporting said casing, an outer guide ring mounted on a foundation and guide vanes connecting said ring above said runner buckets.

9. In combination, a hollow runner shaft, a hollow hub, a plurality of rotatable buckets mounted thereon, an internally disposed reciprocator operating said shaft connected to said buckets, a transverse shaft mounted thereon, a collar connected thereto, a stationary yoke adapted to move said collar vertically on the runner shaft, remote means for actuating said yoke, a stationary casing enclosing said runner shaft and said yoke, an inner guide ring supporting said casing, an outer guide ring mounted on a foundation, guide vanes connecting said ring above said runner buckets, a draft tube and a plurality of draft tube vanes below said buckets.

10. In combination, in a hydraulic turbine, a runner shaft and hub, a core tube beneath the hub and surrounding part of the hub, a draft tube forming a vertical chamber surrounding said shaft and hub and forming a vertical passage for fluid, and adjustable buckets on said hub at right angles to the flow of water through the chamber.

11. In combination, in a hydraulic turbine, a foundation forming a draft tube and vertical chamber, a runner in said chamber having a hub thereon, a core tube beneath the hub and surrounding a part thereof, and buckets on said hub extending at right angles to the flow of water through the chamber.

12. In combination, in a hydraulic turbine, a runner shaft and hub, a core tube beneath the hub and surrounding part of the hub, a draft tube forming a vertical passage for water, and vanes, each attached at one end to the core tube and at the other end to the draft tube.

13. In combination, in a hydraulic turbine, a runner shaft and hub, a core tube beneath the hub and surrounding part thereof, a draft tube forming a vertical water passage around the hub, and stationary vanes between the two tubes.

14. In combination, a vertical passageway, a plurality of stationary guide vanes located in said passageway, a plurality of runner blades, said blades having overlapping radial edges said edges being of the same shape so that the radial edges of said blades will overlap each other in closed position and each forward edge of one blade will be substantially in contact with the trailing edge of another blade, and a single means for cutting off the flow of fluid through said passageway or regulating the speed of rotation of said runner blades.

15. In combination, in a hydraulic turbine, a vertical passageway for the passage of fluids, a runner located in said passageway including a plurality of blades and a plurality of vanes all located entirely within the cylindrical plane defined by said vertical passageway and a single operating means for cutting off the flow of fluid through said passageway, or regulating the speed of rotation of said runner blades including mechanism for adjustment of the angle of the runner blades.

16. In combination, in a hydraulic turbine, a vertical passageway for the passage of fluids, a runner located in said passageway including a plurality of blades a plurality of guide vanes all located entirely within said passageway, and a single operating means for cutting off the flow of fluids in said passageway, or regulating the speed of rotation of said runner blades including mechanism for adjustment of said runner blades to greater or less overlapping of said blades.

In testimony whereof, I affix my signature.

GEORGE A. BIGGS.